United States Patent
Cai et al.

(10) Patent No.: US 7,734,027 B2
(45) Date of Patent: Jun. 8, 2010

(54) CALL CONTROL COMPONENT COLLECTION OF COMMUNICATION DEVICE IDENTIFICATION INFORMATION FOR INTERNET PROTOCOL ENDPOINT

(75) Inventors: Yigang Cai, Naperville, IL (US); Xu Chen, QingDao (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1238 days.

(21) Appl. No.: 10/454,342

(22) Filed: Jun. 4, 2003

(65) Prior Publication Data

US 2004/0249954 A1 Dec. 9, 2004

(51) Int. Cl.
G06F 15/16 (2006.01)
H04M 1/56 (2006.01)
H04M 15/06 (2006.01)

(52) U.S. Cl. .................. 379/142.06; 379/900; 709/227; 370/352; 370/353

(58) Field of Classification Search ............... 709/227, 709/206; 370/352–353; 379/900, 142.06, 379/142.01
See application file for complete search history.

(56) References Cited

U.S. PATENT DOCUMENTS

| | | | |
|---|---|---|---|
| 5,999,616 A * | 12/1999 | Fellner et al. | 379/247 |
| 6,141,341 A * | 10/2000 | Jones et al. | 370/352 |
| 6,144,671 A * | 11/2000 | Perinpanathan et al. | 370/409 |
| 6,298,128 B1 * | 10/2001 | Ramey et al. | 379/142.01 |
| 6,304,651 B1 * | 10/2001 | Cramer et al. | 379/221.01 |
| 6,324,271 B1 | 11/2001 | Sawyer et al. | |
| 6,345,047 B1 * | 2/2002 | Regnier | 370/352 |
| 6,404,764 B1 | 6/2002 | Jones et al. | |
| 6,483,912 B1 * | 11/2002 | Kalmanek et al. | 379/219 |
| 6,668,046 B1 * | 12/2003 | Albal | 379/119 |
| 6,862,342 B1 * | 3/2005 | Hua et al. | 379/88.13 |
| 6,873,692 B1 * | 3/2005 | Silver et al. | 379/142.17 |
| 6,914,971 B1 * | 7/2005 | Bruening | 379/215.01 |
| 6,920,208 B1 * | 7/2005 | Rosen et al. | 379/126 |
| 6,937,572 B1 * | 8/2005 | Egan et al. | 370/252 |
| 6,996,211 B2 * | 2/2006 | Reynolds et al. | 379/88.21 |
| 7,016,672 B1 * | 3/2006 | Lipsit | 455/425 |
| 7,324,499 B1 * | 1/2008 | Borella et al. | 370/349 |
| 7,346,930 B1 * | 3/2008 | Boydstun et al. | 726/29 |
| 2002/0101853 A1 | 8/2002 | Siegrist et al. | |
| 2002/0159440 A1 | 10/2002 | Mussman et al. | |
| 2002/0172338 A1 | 11/2002 | Lee et al. | |
| 2003/0086557 A1 * | 5/2003 | Shambaugh et al. | 379/266.07 |
| 2003/0190024 A1 * | 10/2003 | Ju | 379/142.16 |
| 2006/0105762 A1 * | 5/2006 | Lipsit | 455/423 |
| 2007/0016796 A1 * | 1/2007 | Singhal | 713/183 |

OTHER PUBLICATIONS

University of Delaware. "Centex Telephone Software Features." Feb. 24, 2001 accessd Sep. 10, 2007 <http://web.archive.org/web/20010224025722/http://www.udel.edu/TelephoneServices/centex-features.shtml>.*

* cited by examiner

Primary Examiner—Philip J Chea
(74) Attorney, Agent, or Firm—Carmen Patti Law Group, LLC (57) ABSTRACT

An apparatus in one example comprises one or more call control components. One or more of the one or more call control components connect an internet protocol call initiated by a communication device to an internet protocol endpoint. One or more of the one or more call control components collect identification information of the communication device and send the identification information to the internet protocol endpoint.

30 Claims, 5 Drawing Sheets

CALL CONTROL COMPONENT COLLECTION OF COMMUNICATION DEVICE IDENTIFICATION INFORMATION FOR INTERNET PROTOCOL ENDPOINT

TECHNICAL FIELD

The invention relates generally to communications and more particularly to collection of communication device identification information.

BACKGROUND

A voice telecommunications network in one example allows a first user to place a telephone call to a second user of the voice telecommunications network. For example, the voice telecommunications network comprises a public switched telephone network ("PSTN"). The voice telecommunications network comprises a caller identification service.

The caller identification service provides identification information of a calling party to a receiving party of a telephone call. For example, the second user employs the caller identification service to receive identification information of the calling party (e.g., the first user) of the telephone call. The identification information comprises a name and/or a phone number of the calling party. As one shortcoming, the caller identification service is available to trace only public switched telephone network telephone calls.

An internet protocol ("IP") network in one example allows a first user to place an internet protocol call to a second user of the internet protocol network. The internet protocol call may transfer voice, data, and/or video content between the users of the internet protocol network. Network administrators are able to trace the internet protocol call from a control node in the internet protocol network. For example, the network administrators can gather identification information of the calling party of the internet protocol call. As one shortcoming, the called party is unable to initiate a trace of the internet protocol call to obtain the identification information of the calling party.

Thus, a need exists for a provision of identification information of a calling party to a called party of an internet protocol call in an internet protocol network.

SUMMARY

The invention in one embodiment encompasses an apparatus. The apparatus comprises one or more call control components. One or more of the one or more call control components connect an internet protocol call initiated by a communication device to an internet protocol endpoint. One or more of the one or more call control components collect identification information of the communication device and send the identification information to the internet protocol endpoint.

Another embodiment of the invention encompasses a method. A request is received from an internet protocol endpoint for identification information of a communication device that initiated an internet protocol call with the internet protocol endpoint. The identification information of the communication device is collected to send to the internet protocol endpoint in response to the request.

Yet another embodiment of the invention encompasses an article. The article comprises one or more computer-readable signal-bearing media. The article comprises means in the one or more media for receiving a request from an internet protocol endpoint for identification information of a communication device that initiated an internet protocol call with the internet protocol endpoint. The article comprises means in the one or more media for collecting the identification information of the communication device to send to the internet protocol endpoint in response to the request.

DESCRIPTION OF THE DRAWINGS

Features of exemplary implementations of the invention will become apparent from the description, the claims, and the accompanying drawings in which:

DETAILED DESCRIPTION

Figure 1:
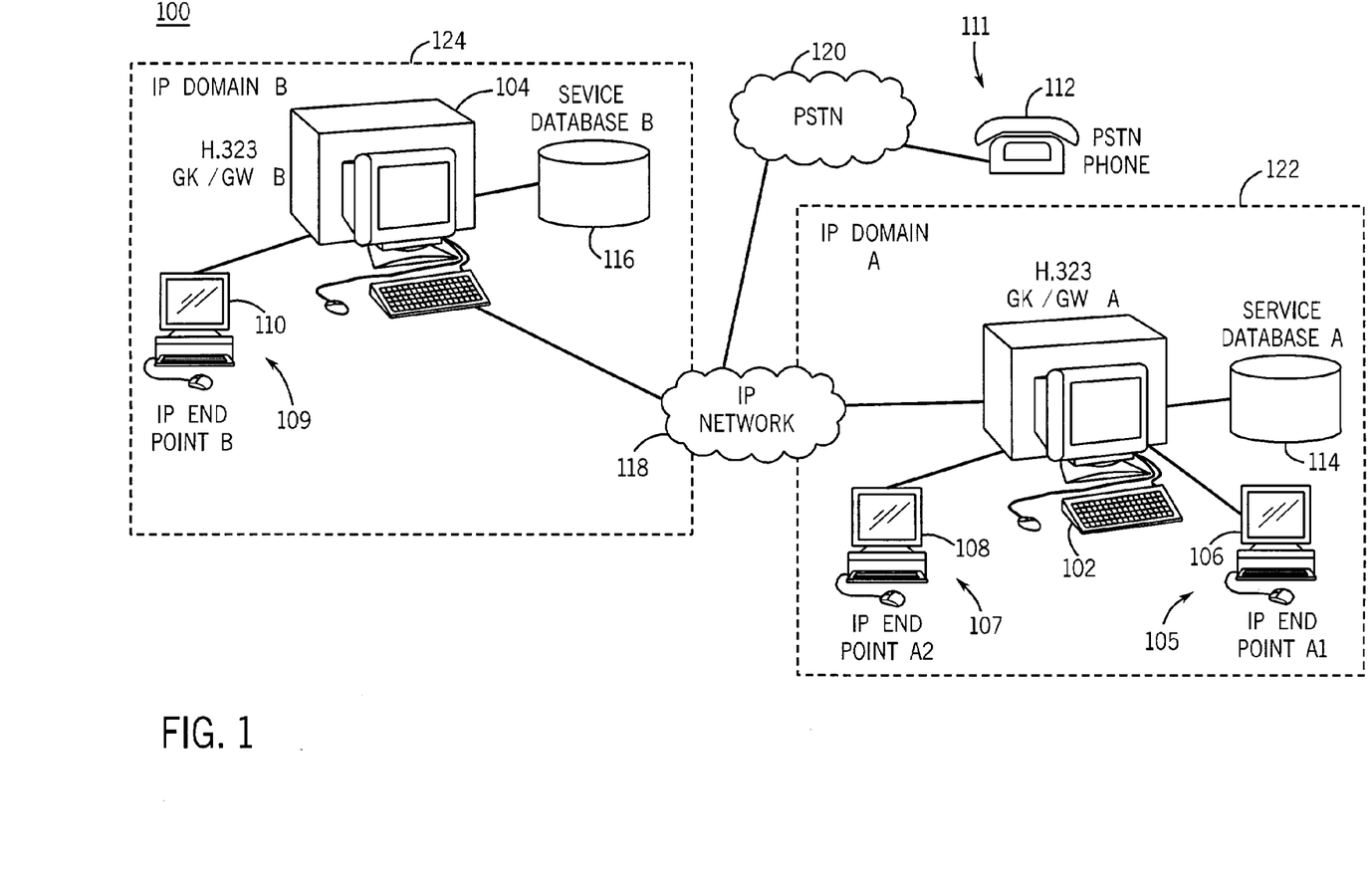
FIG. 1 is a representation of an exemplary implementation of an apparatus that comprises one or more call control components, one or more communication devices, one or more internet protocol service databases, and one or more internet protocol networks.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more call control components 102 and 104, one or more communication devices 105, 107, 109, and 111, for example, internet protocol endpoints 106, 108, and 110 and landline endpoint 112, respectively, one or more internet protocol service databases 114 and 116, and one or more internet protocol networks 118. A public switched telephone network ("PSTN") 120 communicatively couples the landline endpoint 112 with the internet protocol network 118. A first internet protocol domain 122 comprises the call control component 102, the internet protocol endpoints 106 and 108, and the internet protocol service database 114. A second internet protocol domain 124 comprises the call control component 104, the internet protocol endpoint 110, and the internet protocol service database 116.

Each of the call control components 102 and 104 in one example comprises a processor and a recordable data storage medium. The call control components 102 and 104 in one example comprise softswitchs promoted by the International Packet Communications Consortium (IPCC, http://www.softswitch.org). The softswitch controls connection services, applied processes, routing, transfer of control, and management functions for an internet protocol call. The call control component 102 comprises an interface to the internet protocol network 118 for the internet protocol endpoints 106 and 108. The call control component 104 comprises an interface to the internet protocol network 118 for the internet protocol endpoint 110. The call control components 102 and 104 in one example comprise H.323 gate keepers and gateways ("H.323 GK/GWs"). "H.323" represents a standard published by the International Telecommunication Union (ITU, http://www.itu.int/home) for real-time voice and videoconferencing in packet networks (e.g., the internet protocol network 118).

The call control components 102 and 104 communicate with the internet protocol network 104 by the H.323 communication protocol suite, for example, H.225 (call control), H.245 (control messages), G.711 (audio), and H.261 (video) protocol messages. The call control components 102 and 104 in one example communicate with the internet protocol service databases 114 and 116 by transmission control protocol/internet protocol ("TCP/IP") messages. The call control components 102 and 104 control media flow and signal flow in the first and second internet protocol domains 122 and 124, respectively. For example, the call control components 102 and 104 control audio, data, and video signaling and bearer traffic. The call control components 102 and 104 handle internet protocol call requests and routes the internet protocol call to a termination endpoint of the internet protocol call.

The call control components 102 and 104 in one example support an internet protocol call trace service. For example, users of the internet protocol endpoints 106, 108, and 110 may subscribe to the internet protocol call trace service to access identification information of a calling party of an internet protocol call. In one example, a fee for the subscription to the internet protocol call trace service comprises a flat monthly price. In another example, the fee is based on a number of times the user successfully employs the internet protocol call trace service. In yet another example, the fee is based on an amount of information requested from the internet protocol call trace service by the user. In still yet another example, the fee is based on a type of information requested from the internet protocol call trace service by the user. The call control components 102 and 104 in one example keeps a call trace log to record the activity of the internet protocol call trace service. For example, the call trace log records the number of call traces executed by the internet protocol endpoints 106, 108, and 110, the number of call traces at various call trace levels, the number of successful call traces, and the number of unsuccessful call traces.

An initiator of the internet protocol call trace service comprises any one or more of the users of the internet protocol endpoints 106, 108, and 110 or an internet protocol network operator. For example, the initiator sends an invoke message to one or more of the call control components 102 and 104. The initiator may send the invoke message to trigger a collection of the identification information of the calling party of the internet protocol call before acceptance of the internet protocol call, at any time in the duration of the internet protocol call, or after completion of the internet protocol call. For example, the initiator may send the invoke message during call setup, alerting, or talk stages of the internet protocol call.

The call control components 102 and 104 check permissions of the initiator with the internet protocol call trace service. If the internet protocol call trace service authorizes the initiator access to the identification information of the calling party, then one or more of the call control components 102 and 104 collect the identification information from one or more of the internet protocol service databases 114 and 116 to send to the initiator.

The internet protocol call trace service may set access levels to limit an amount of identification information that is available for distribution to the internet protocol endpoints 106, 108, and 110. One exemplary implementation of the access levels is now presented, for explanatory purposes. The internet protocol call trace service in one example allows the internet protocol endpoints 106, 108, and 110 to be set at one of five access levels. For example, access level one allows access only to the calling party number. Access level two allows access to the calling party number and user name. Access level three allows access to the calling party number, user name, and call type. Access level four allows access to calling party number, user name, call type, and internet protocol address. Access level five allows access to any of the identification information stored in the internet protocol service databases 114 and 116.

The communication devices 105, 107, 109, and 111 (e.g., the internet protocol endpoints 106, 108, and 110 and the landline endpoint 112) may set protection levels to limit an amount of identification information that is available for distribution by the internet protocol call trace service. One exemplary implementation of the protection levels is now presented, for explanatory purposes. The internet protocol call trace service in one example allows the internet protocol endpoints 106, 108, and 110 to be set at one of four protection levels. For example, protection level one allows distribution of any of the identification information stored in the internet protocol service databases 114 and 116. Protection level two allows distribution of any of the identification information stored in the internet protocol service databases 114 and 116 except location and mail address. Protection level three allows distribution of the calling party number and user name. Protection level four only allows distribution of information designated as open for distribution by the internet protocol endpoints 106, 108, and 110.

In one example, the internet protocol call trace service is endpoint based. For example, the internet protocol endpoint 106 subscribes to the internet protocol call trace service. Any user may employ the internet protocol endpoint 106 to access identification information through the internet protocol call trace service. The endpoint based internet protocol call trace service may be password protected to limit which users employ the internet protocol endpoint 106 to access the identification information.

In another example, the internet protocol call trace service is user based. For example, a user subscribes to the internet protocol call trace service. The user may employ any of the internet protocol endpoints 106, 108, and 110 to access identification information through the internet protocol call trace service. The user enters a user name and password into the internet protocol endpoints 106, 108, and 110 to access an account of the internet protocol call trace service and receive authorization to collect identification information.

The call control components 102 and 104 and the internet protocol endpoints 106, 108, and 110 communicate internet protocol call trace service information via H.323 messages, for example, facility messages. In one example, the internet protocol endpoint 106 sends a facility invoke message to the call control component 102 to request identification information from the internet protocol call trace service. In another example, the call control component 102 sends a facility response message that contains the identification information to the internet protocol endpoint 106 as a response to the facility invoke message. In yet another example, the call control component 102 sends a facility invoke message to the call control component 104 to request identification information of an internet protocol call endpoint under the control of the call control component 104. One exemplary implementation of the facility messages is now presented, for explanatory purposes. The facility messages comprise a plurality of information fields (e.g., Facility Message Parameters) as shown in the following table.

| Facility Message Parameter | Description |
| --- | --- |
| Call Reference | Uniquely identifies the internet protocol call. |
| Call Trace Service ID | Indicates that the facility message relates to the internet protocol call trace service. The internet protocol call service provider can decide on a value for the Call Trace Service ID. |
| Call Trace Type | Contains a description of the type of the facility message. The Call Trace Type may be any one of the following exemplary values:<br>1. Invoke. (IP endpoint to GK/GW)<br>2. Response. (GK/GW to GK/GW or GK/GW to IP endpoint)<br>3. Require User ID. (GK/GW to IP endpoint)<br>4. Service Subscribe. (IP endpoint to GK/GW)<br>5. Service Unsubscribe. (IP endpoint to GK/GW)<br>6. Service Activate. (IP endpoint to GK/GW)<br>7. Service Deactivate. (IP endpoint to GK/GW)<br>8. Change User Info. (IP endpoint to GK/GW) |
| Call Trace Response Value | Contains the value of the internet protocol call trace response. Used when Call Trace Type is set at Response. The Call Trace Response Value may be any one of the following exemplary values:<br>0. Successful.<br>1. Call information can't be retrieved.<br>2. User does not have permission.<br>3. User authentication failure.<br>4. Network failure.<br>5. Failed due to call trace protection. |
| Call Trace Result | Contains all the permitted calling party's identification information if the Call Trace Response Value is set at Successful. The Call Trace Result contains any combination of the following exemplary portions of identification information:<br>Calling party number.<br>Calling party internet protocol address.<br>Calling party user name.<br>Calling party phone type.<br>Calling party company name.<br>Calling party email address.<br>Calling party URL.<br>Calling party location. |
| Call Trace User Info | Contains identification information of the initiator of the facility message. For example, the internet protocol call trace service employs the identification information for authorization, service subscribe/unsubscribe, or service activate/deactivate. The Call Trace User Info may be any one or more of the following exemplary values:<br>1. Internet protocol phone number.<br>2. Internet protocol address.<br>3. User name.<br>4. Password. |
| Subscription Type | Contains an indication of the internet protocol call trace service subscription type. The Subscription Type may be any one of the following exemplary values:<br>0. internet protocol endpoint based.<br>1. internet protocol user based. |

In one example, only one of the communication devices 105, 107, 109, and 111 comprises an internet protocol endpoint (e.g., the internet protocol endpoint 106). In another example, the communication devices 105, 107, and 109 comprise internet protocol endpoints (e.g., the internet protocol endpoint 106, 108, and 110), as shown in FIG. 1. Each of the internet protocol endpoints 106, 108, and 110 in one example comprises a processor and a recordable data storage medium. The internet protocol endpoints 106, 108, and 110 initiate or terminate internet protocol calls. For example, the internet protocol endpoints 106, 108, and 110 support the H.323 endpoint protocol. The internet protocol endpoints 106, 108, and 110 in one example comprise internet protocol telephone software and/or an internet protocol telephone.

The internet protocol endpoints 106, 108, and 110 in one example comprise call trace buttons. For example, a user of the internet protocol endpoint 106 presses the call trace button and the internet protocol endpoint 106 fills the Call Trace User Info field of a facility invoke message with identification information of the internet protocol endpoint 106. Then, the internet protocol endpoint 106 sends the facility invoke message to the call control component 102 to initiate the internet protocol call trace service. The internet protocol endpoints 106, 108, and 110 in one example comprise call trace menus. The call trace menu in one example comprises one or more options for the user of the internet protocol endpoint 106. For example, the call trace menu allows for internet protocol call trace service account management such as service subscribe/unsubscribe and service activate/deactivate. The internet protocol endpoints 106, 108, and 110 register with the call control components 102 and 104 as internet protocol subscribers. For example, the internet protocol endpoints 106, 108, and 110 provide internet protocol service information to the call control component 102 and 104.

The internet protocol service information in one example comprises the identification information of the internet protocol endpoints 106, 108, and 110. For example, the identification information of the internet protocol endpoints 106, 108, and 110 comprise one or more of an internet protocol phone number, name, company name, phone type, email address, location, internet protocol address, and uniform resource locator ("URL") of the internet protocol endpoints 106, 108, and 110. The call control components 102 and 104 store the internet protocol service information in the internet protocol service databases 114 and 116.

Upon initiation of an internet protocol call, the call control components 102 and 104 query the internet protocol service databases 114 and 116 to access internet protocol service information for the internet protocol call. The internet protocol service databases 114 and 116 in one example store service information of the internet protocol network 118, the internet protocol endpoints 106, 108, and 110, and the landline endpoint 112. For example, the internet protocol service database 114 stores the identification information of the internet protocol endpoints 106 and 108 and the internet protocol service database 116 stores the identification information of the internet protocol endpoint 110. The call control components 102 and 104 may request, from the internet protocol service databases 114 and 116, the internet protocol service information of one or more of the internet protocol endpoints 106, 108, and 110 involved in the internet protocol call. The internet protocol service databases 114 and 116 return the requested internet protocol service information to the call control components 102 and 104 in a response message. In one example, the internet protocol service databases 114 and 116 comprise Java based database engines. In another example, the internet protocol service databases 114 and 116 comprise common object request broker architecture ("CORBA") interfaces.

The internet protocol network 118 communicatively couples the first internet protocol domain 122, the second internet protocol domain 124, and the public switched telephone network 120. For example, the internet protocol network 118 carries one or more internet protocol calls and/or one or more internet protocol call trace service messages (e.g., facility messages) between one or more of the first internet protocol domain 122, the second internet protocol domain 124, and the public switched telephone network 120. The public switched telephone network 120 interfaces the landline endpoint 112 with the internet protocol network 118. For example, the public switched telephone network 120 carries one or more calls between the landline endpoint 112 and the internet protocol network 118.

Figure 2:
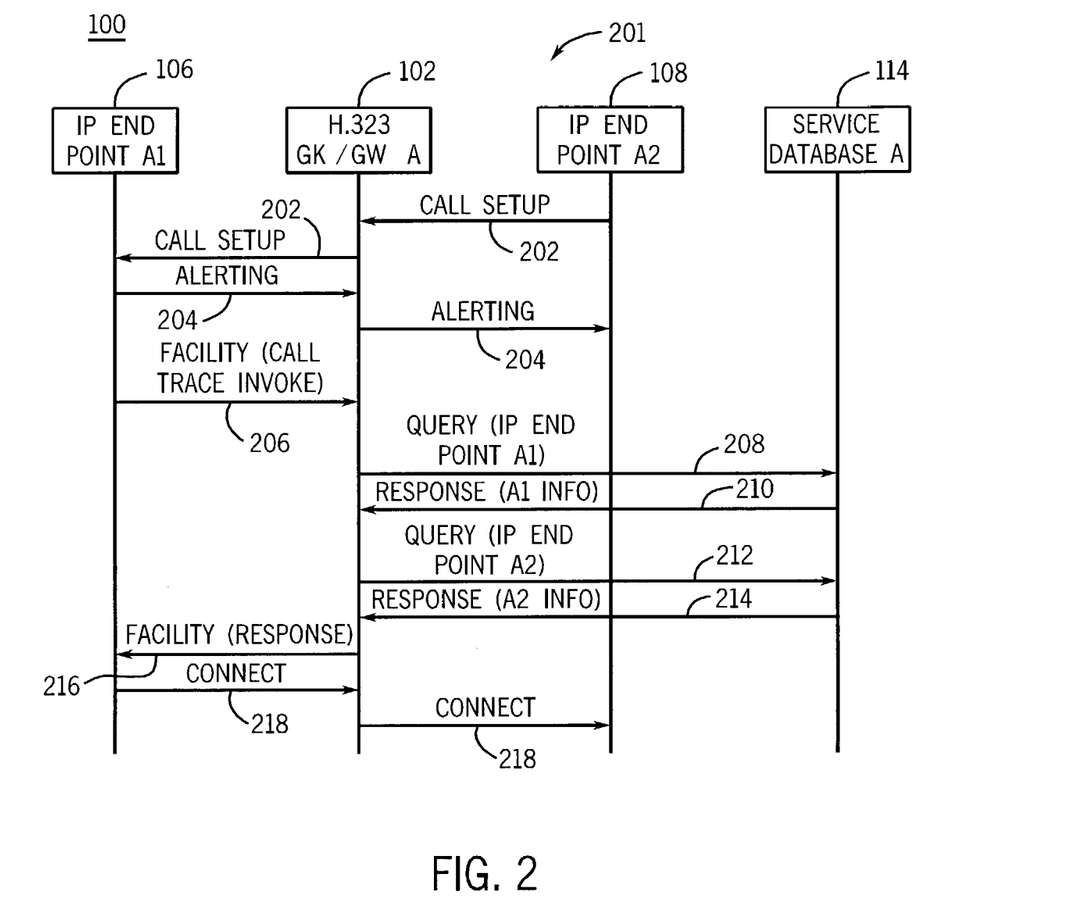
FIG. 2 is a representation of one exemplary message flow for a collection of identification information of a first internet protocol endpoint by a second internet protocol endpoint of the one or more communication devices of the apparatus of FIG. 1. The collection occurs prior to acceptance of an internet protocol call between the first and second internet protocol endpoints. The first and second internet protocol endpoints are located in the same internet protocol domain.

Turning to FIG. 2, an illustrative description of one exemplary operation of the apparatus 100 is now presented, for explanatory purposes. A message flow 201 represents an exemplary connection of an internet protocol call from the communication device 107 (e.g., the internet protocol endpoint 108) to the internet protocol endpoint 106. The message flow 201 also represents exemplary collection of identification information of the internet protocol endpoint 108 by the internet protocol endpoint 106 prior to acceptance of the internet protocol call. The internet protocol endpoints 106 and 108 are both located in the first internet protocol domain 122 (FIG. 1). A user of the internet protocol endpoint 106 in one example subscribes to the internet protocol call trace service of the call control component 102. The user of the internet protocol endpoint 106 has configured and activated the internet protocol call trace service prior to the initiation of the message flow 201.

To initiate the internet protocol call with the internet protocol endpoint 106, the internet protocol endpoint 108 sends a call setup message 202 to the call control component 102. The call setup message 202 in one example comprises an H.225 call processing message. Upon receipt of the call setup message 202, the call control component 102 sends the call setup message 202 to the internet protocol endpoint 106. The internet protocol endpoint 106 sends an alerting message 204 to the call control component 102 in response to the call setup message 202. The call control component 102 sends the alerting message 204 to the internet protocol endpoint 108.

The user of the internet protocol endpoint 106 in one example wants to see the identification information of the calling party (e.g., the internet protocol endpoint 108) before answering and connecting to the internet protocol call. For example, the user of the internet protocol endpoint 106 presses the call trace button on the internet protocol endpoint 106 to send a trace initiation message 206 to the call control component 102. "FACILITY (CALL TRACE INVOKE)" in one example serves to represent the trace initiation message 206. The trace initiation message 206 in one example comprises a facility message with the Call Trace Type field set at "invoke" and the Subscription Type field set to "phone based." The internet protocol endpoint 106 fills the Call Trace User Info field in the facility message with identification information of the internet protocol endpoint 106.

Upon receipt of the trace initiation message 206, the call control component 102 interprets the trace initiation message 206 and realizes that the Call Trace Type field is set at "invoke." Therefore, the call control component 102 sends a query message 208 to the internet protocol service database 114. "QUERY (IP END POINT A1)" in one example serves to represent the query message 208. "IP END POINT A1" in one example serves to represent an identifier of the internet protocol endpoint 106. The query message 208 requests internet protocol call trace service information of the internet protocol endpoint 106. The internet protocol call trace service information in one example comprises a priority level, identification information, and a password for the internet protocol endpoint 106. The call control component 102 employs the internet protocol call trace service information to determine if the internet protocol endpoint 106 has authorization for use of the internet protocol call trace service to obtain identification information of the internet protocol endpoint 108.

The internet protocol service database 114 sends the internet protocol call trace service information of the internet protocol endpoint 106 to the call control component 102 in a query response message 210. "RESPONSE (A1 INFO)" in one example serves to represent the query response message 210. "A1 INFO" in one example serves to represent the internet protocol call trace service information of the internet protocol endpoint 106.

The internet protocol call trace service information of the internet protocol endpoint 106 in one example authorizes the internet protocol endpoint 106 to use the internet protocol call trace service. Therefore, the call control component 102 sends a query message 212 to the internet protocol service database 114. "QUERY (IP END POINT A2)" in one example serves to represent the query message 212. "IP END POINT A2" in one example serves to represent an identifier of the internet protocol endpoint 108. The query message 212 requests identification information of the internet protocol endpoint 108.

The internet protocol service database 114 sends the identification information of the internet protocol endpoint 108 to the call control component 102 in a query response message 214. "RESPONSE (A2 INFO)" in one example serves to represent the query response message 214. "A2 INFO" in one example serves to represent the identification information of the internet protocol endpoint 108.

The call control component 102 checks the service information and identification information of the internet protocol endpoint 108 to determine what types of the identification information may be sent to the internet protocol endpoint 106. For example, the call control component 102 checks a call trace protection level of the internet protocol endpoint 108. The call control component 102 determines what portion of the identification information the internet protocol endpoint 108 allows the call control component 102 to send to the internet protocol endpoint 106. The call control component 102 sends the portion of the identification information of the internet protocol endpoint 108 to the internet protocol endpoint 106 in a trace initiation response message 216. "FACILITY (RESPONSE)" in one example serves to represent the trace initiation response message 216.

The internet protocol endpoint 106 interprets the trace initiation response message 216 to extract the identification information of the internet protocol endpoint 108. The internet protocol endpoint 106 in one example displays the identification information of the internet protocol endpoint 108 for the user of the internet protocol endpoint 106. The user of the internet protocol endpoint 106 in one example employs the identification information of the internet protocol endpoint 108 to make a decision whether to accept the internet protocol call. For example, the user of the internet protocol endpoint 106 presses a connect button on the internet protocol endpoint 106 to accept the internet protocol with the user of the internet protocol endpoint 108 and send a connect message 218 to the call control component 102. The call control component 102 sends the connect message 218 to the internet protocol endpoint 108 to communicatively couple the internet protocol endpoint 106 with the internet protocol endpoint 108.

Figure 3:
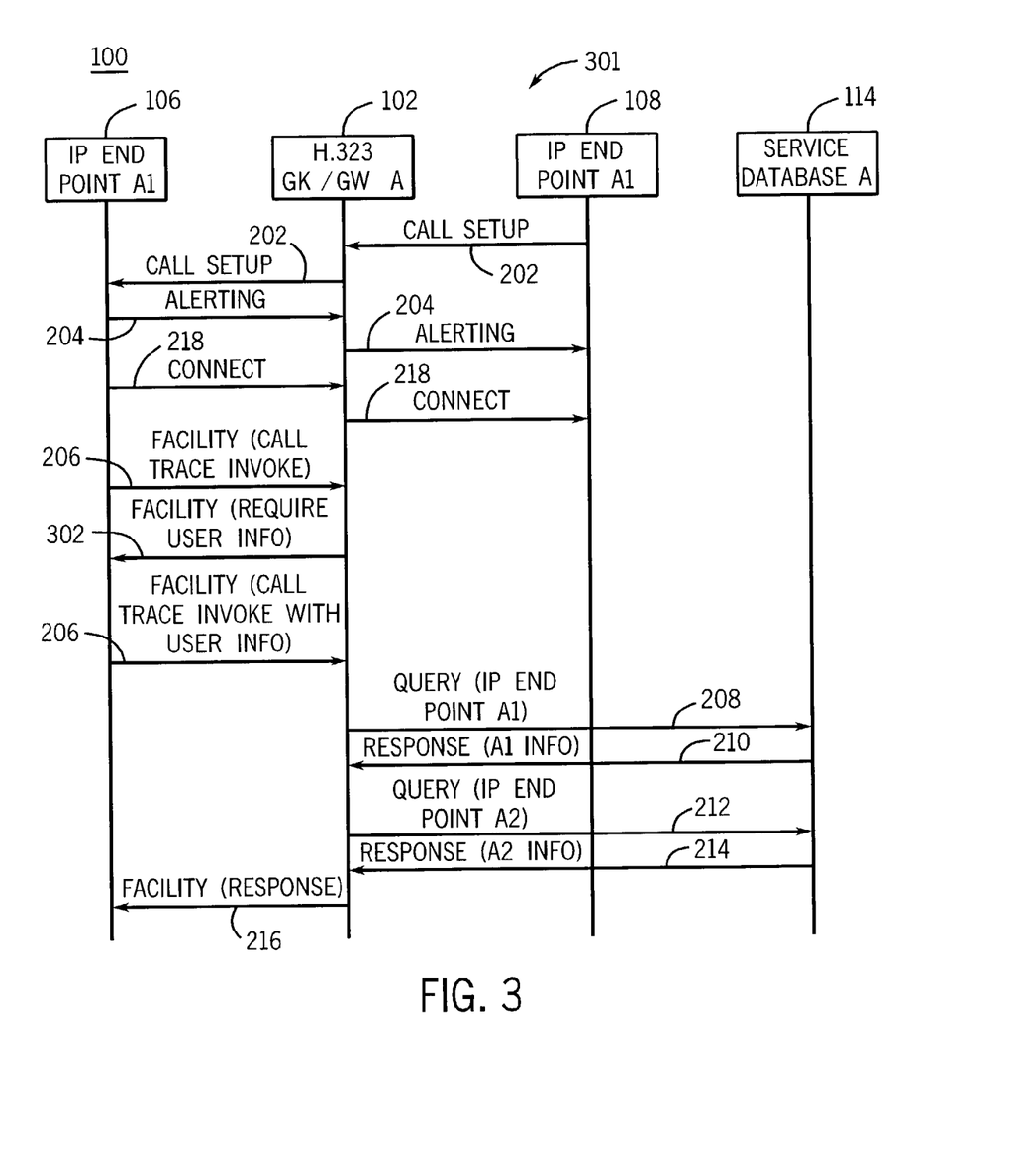
FIG. 3 is a representation of another exemplary message flow for a collection of identification information of a first internet protocol endpoint by a second internet protocol endpoint of the one or more communication devices of the apparatus of FIG. 1. The collection occurs after acceptance and connection of an internet protocol call between the first and second internet protocol endpoints. The first and second internet protocol endpoints are located in the same internet protocol domain.

Turning to FIG. 3, an illustrative description of another exemplary operation of the apparatus 100 is now presented, for explanatory purposes. A message flow 301 represents an exemplary connection of an internet protocol call from the communication device 107 (e.g., the internet protocol endpoint 108) to the internet protocol endpoint 106 and collection of identification information of the internet protocol endpoint 108 by the internet protocol endpoint 106 as described in the message flow 201. However, in the message flow 301 the collection of the identification information occurs after acceptance and connection of the internet protocol call.

The internet protocol endpoint 106, the internet protocol endpoint 108, and the call control component 102 send and/or receive the call setup messages 202 and the alerting messages 204 as described in the message flow 201. After sending the alerting message 204, the internet protocol endpoint 106 sends the connect message 218 to the call control component 102 to accept and join into the internet protocol call with the internet protocol endpoint 108. Once involved in the internet protocol call, the user of the internet protocol endpoint 106 in one example wants to see the identification information of the calling party (e.g., the internet protocol endpoint 108). Therefore, the user of the internet protocol endpoint 106 presses the call trace button to send the trace initiation message 206 to the call control component 102.

The call control component 102 in one example determines that the trace initiation message 206 lacks sufficient identification information of the internet protocol endpoint 106. The call control component 102 sends an information request message 302 to the internet protocol endpoint 106. "FACILITY (REQUIRE USER INFO)" in one example serves to represent the information request message 302. The information request message 302 indicates to the internet protocol endpoint 106 that additional identification information is required. In response to information request message 302, the internet protocol endpoint 106 sends the trace initiation message 206 with the required additional identification information. Upon receipt of the trace initiation message 206, the call control component 102 queries the database and returns the identification information to the internet protocol endpoint 106 as described in the message flow 201.

Figure 4:
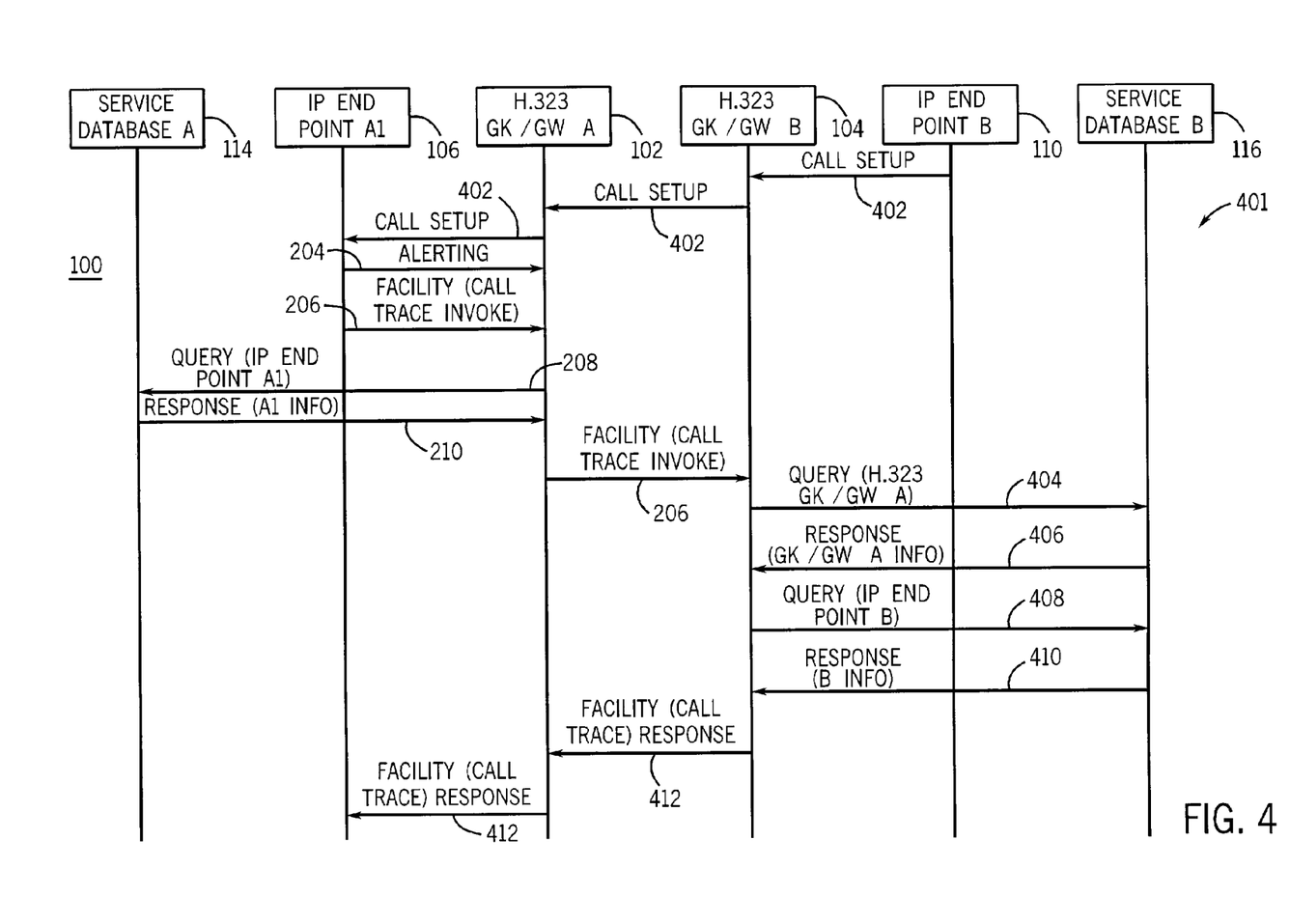
FIG. 4 is a representation of yet another exemplary message flow for a collection of identification information of a first internet protocol endpoint by a second internet protocol endpoint of the one or more communication devices of the apparatus of FIG. 1. The collection occurs prior to acceptance of an internet protocol call between the first and second internet protocol endpoints. The first and second internet protocol endpoints are located in different internet protocol domains.

Turning to FIG. 4, an illustrative description of yet another exemplary operation of the apparatus 100 is now presented, for explanatory purposes. A message flow 401 represents an exemplary connection of an internet protocol call from the communication device 109 (e.g., the internet protocol endpoint 110) to the internet protocol endpoint 106 and collection of identification information of the internet protocol endpoint 110 by the internet protocol endpoint 106 as described analogously in the message flow 201. However, in the message flow 401 the internet protocol endpoints 106 and 110 are located in different internet protocol domains. For example, the internet protocol endpoint 106 is located in the first internet protocol domain 122 (FIG. 1) and the internet protocol endpoint 110 is located in the second internet protocol domain 124 (FIG. 1).

To initiate the internet protocol call with the internet protocol endpoint 106, the internet protocol endpoint 110 sends a call setup message 402 to the call control component 104. The call setup message 402 in one example comprises an H.225 call processing message. Upon receipt of the call setup message 402, the call control component 104 of the second internet protocol domain 124 (FIG. 1) sends the call setup message 402 to the call control component 102 of the first internet protocol domain 122 (FIG. 1). Upon receipt of the call setup message 402, the call control component 102 sends the call setup message 402 to the internet protocol endpoint 106. The internet protocol endpoint 106 sends the alerting message 404 to the call control component 102 in response to the call setup message 402.

To obtain the identification information of the calling party (e.g., the internet protocol endpoint 110) before answering the internet protocol call, the user of the internet protocol endpoint 106 presses the call trace button on the internet protocol endpoint 106 to send the trace initiation message 206 to the call control component 102 as described in the message flow 201. Upon receipt of the trace initiation message 206, the call control component 102 sends the query message 208 to the internet protocol service database 114 and receives the query response message 210 as described in the message flow 201.

The internet protocol call trace service information of the internet protocol endpoint 106 in one example authorizes the internet protocol endpoint 106 to use the internet protocol call trace service. Therefore, the call control component 102 in one example sends a query message to the internet protocol service database 114 to request the identification information of the calling party (e.g., the internet protocol endpoint 110). The internet protocol service database 114 sends an indication to the call control component 102 that the internet protocol service database 114 does not store the identification information of the internet protocol endpoint 110. Therefore, since the call control component 104 manages the internet protocol endpoint 110, the call control component 102 sends the trace initiation message 206 to the call control component 104. The trace initiation message 206 from the call control component 102 to the call control component 104 in one example comprises a gather identification information message.

Upon receipt of the trace initiation message 206, the call control component 104 interprets the trace initiation message 206 and realizes that the Call Trace Type field is set at "invoke." Therefore, the call control component 104 sends a query message 404 to the internet protocol service database 116. "QUERY (H.323 GK/GW A)" in one example serves to represent the query message 404. "H.323 GK/GW A" in one example serves to represent an identifier of the call control component 102. The query message 404 requests internet protocol call trace service information of the call control component 102. The internet protocol call trace service information in one example comprises a priority level, identification information, and a password for call control component 102. The call control component 104 employs the internet protocol call trace service information to determine if the call control component 102 has authorization for use of the internet protocol call trace service to obtain identification information of the internet protocol endpoint 110. The internet protocol service database 116 sends the internet protocol call trace service information of the call control component 102 to the call control component 104 in a query response message 406. "RESPONSE (GK/GW A INFO)" in one example serves to represent the query response message 210. "GK/GW A INFO" in one example serves to represent the internet protocol call trace service information of the call control component 102.

The internet protocol call trace service information of the call control component 102 in one example authorizes the call control component 102 to use the internet protocol call trace service. Therefore, the call control component 104 in one example sends a query message 408 to the internet protocol service database 116 to request the identification information of the calling party (e.g., the internet protocol endpoint 110). "QUERY (IP END POINT B)" in one example serves to represent the query message 408. "IP END POINT B" in one example serves to represent an identifier of the internet protocol endpoint 110.

The internet protocol service database 116 sends the identification information of the internet protocol endpoint 110 to the call control component 104 in a query response message 410. "RESPONSE (B INFO)" in one example serves to represent the query response message 410. "B INFO" in one example serves to represent the identification information of the internet protocol endpoint 110.

The call control component 104 determines a portion of the identification information that the internet protocol endpoint 110 allows the call control component 104 to send to the call control component 102. The call control component 104 sends the portion of the identification information of the internet protocol endpoint 110 to the call control component 102 in a trace initiation response message 412. "FACILITY (CALL TRACE) RESPONSE" in one example serves to represent the trace initiation response message 412. In one example, the call control component 102 sends the trace initiation response message 412 to the internet protocol endpoint 106. In another example, the call control component 102 interprets the trace initiation response message 412 and sends the identification information of the trace initiation response message 412 to the internet protocol endpoint 106.

Figure 5:
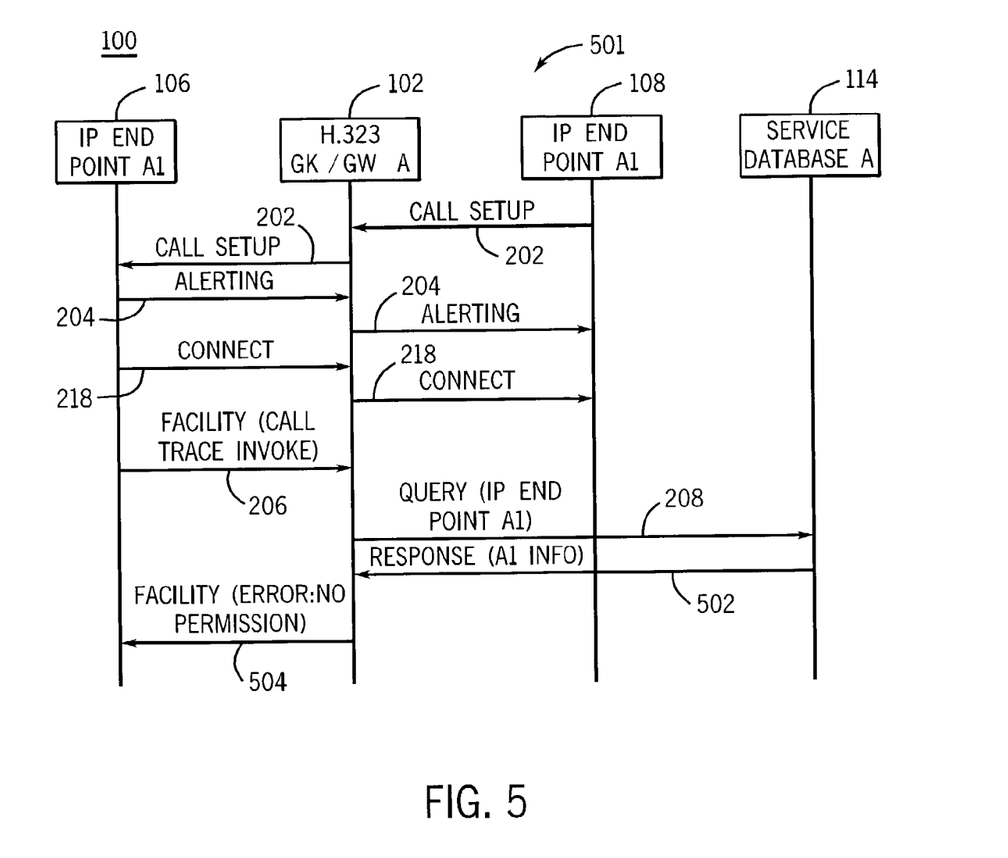
FIG. 5 is a representation of one exemplary message flow for a failure to make a collection of identification information of a first internet protocol endpoint by a second internet protocol endpoint of the one or more communication devices of the apparatus of FIG. 1.

Turning to FIG. 5, an illustrative description of still yet another exemplary operation of the apparatus 100 is now presented, for explanatory purposes. A message flow 501 represents an exemplary connection of an internet protocol call from the communication device 107 (e.g., the internet protocol endpoint 108) to the internet protocol endpoint 106 as described in the message flow 201. The message flow 501 also illustrates a failed collection attempt by the internet protocol endpoint 106 to obtain identification information of the internet protocol endpoint 108.

The internet protocol endpoint 106, the internet protocol endpoint 108, and the call control component 102 send and/or receive the call setup messages 202 and the alerting messages 204, and the connect messages 218 as described in the message flows 201 and 301. The internet protocol endpoint 106 sends the trace initiation message 206 to the call control component 102 to obtain the identification information of the internet protocol endpoint 108. The call control component 102 sends the query message 208 to the internet protocol service database 114 to access the identification information as described in the message flow 201. The query message 208 comprises an indicator of the internet protocol endpoint 106.

The query message 208 requests internet protocol call trace service information of the internet protocol endpoint 106 from the internet protocol service database 114. The call control component 102 employs the internet protocol call trace service information to determine if the internet protocol endpoint 106 has authorization for use of the internet protocol call trace service to obtain identification information of the internet protocol endpoint 108.

The internet protocol service database 114 sends the internet protocol call trace service information of the internet protocol endpoint 106 to the call control component 102 in a query response message 502. "RESPONSE (A1 INFO)" in one example serves to represent the query response message 210. "A1 INFO" in one example serves to represent the internet protocol call trace service information of the internet protocol endpoint 106. In one example, the internet protocol call trace service information indicates to the call control component 102 that the internet protocol endpoint 106 does not have access to the internet protocol call trace service. Therefore, the call control component 102 sends a trace initiation response message 504 to the internet protocol endpoint 106. "FACILITY (ERROR: NO PERMISSION)" in one example serves to represent the trace initiation response message 504.

The internet protocol endpoint 106 displays the error message to the user of the internet protocol endpoint 106 to alert the user that access has been denied to the identification information of the internet protocol endpoint 108. Other exemplary error messages may result from insufficient internet protocol call trace service information for the internet protocol endpoints 106, 108, and 110 in the internet protocol service databases 114 and 116, one or more of the internet protocol endpoints 106, 108, and 110 are not registered internet protocol users, or failure of one or more of the call control components 102 and 104.

The apparatus 100 in one example employs one or more computer-readable signal-bearing media. One example of a computer-readable signal-bearing medium for the apparatus 100 comprises one or more instances of the recordable data storage medium of one or more of the call control components 102 and 104 and the internet protocol endpoints 106, 108, and 110. For example, the recordable data storage medium comprises one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   one or more call control components that run on one or more processor systems;
   wherein one of the one or more call control components connects an internet protocol (IP) call initiated by a communication device to an internet protocol endpoint; and
   wherein the one of the one or more call control components has an interface to an IP network to a) communicatively couple a public switched telephone network (PSTN) to allow the internet protocol endpoint to communicate with at least one landline endpoint and b) allow the internet protocol endpoint to communicate with another internet protocol endpoint located in another IP domain; and
   wherein the one of the one or more call control components collects identification information of the communication device and sends the identification information to the internet protocol endpoint upon a determination that the internet protocol endpoint is authorized to obtain the identification information; and
   wherein the internet protocol endpoint comprises a call trace button; and
   wherein activation of the call trace button sends a trace initiation message to the one of the one or more call control components to initiate an internet protocol call trace service of the one of the one or more call control components that collects the identification information of the communication device; and
   wherein the one of the one or more call control components sends an error message to the internet protocol endpoint when there is insufficient internet protocol call trace service information in an internet protocol service database.

2. The apparatus of claim 1, wherein the one of the one or more call control components that connects the internet protocol call stores the identification information of the communication device in the internet protocol service database; and
   wherein the one of the one or more call control components that collects the identification information accesses the internet protocol service database to gather the identification information of the communication device.

3. The apparatus of claim 2, wherein the internet protocol service database comprises a Java based database engine.

4. The apparatus of claim 2, wherein the internet protocol service database comprises a common object request broker architecture (CORBA) interface.

5. The apparatus of claim 1 in combination with the internet protocol endpoint, wherein the internet protocol endpoint sends a trace initiation message to the one of the one or more call control components that collects the identification information to initiate the collection of the identification information.

6. The apparatus of claim 5, wherein the internet protocol endpoint may send the trace initiation message before acceptance of the internet protocol call, at any time in the duration of the internet protocol call, or after completion of the internet protocol call.

7. The apparatus of claim 1 in combination with the internet protocol endpoint, wherein the internet protocol endpoint sends a trace initiation message to the one of the one or more call control components that collects the identification information; and
   wherein the trace initiation message comprises a request for inclusion of one or more types of information of the communication device in the identification information.

8. The apparatus of claim 7, wherein the identification information of the communication device comprises one or more of an identification number, telephone number, email address, uniform resource locator, and user name of the communication device.

9. The apparatus of claim 1, wherein the identification information of the communication device comprises a location of the communication device.

10. The apparatus of claim 1, wherein the one or more call control components comprise one or more softswitches.

11. The apparatus of claim 1, wherein a single call control component of the one or more call control components connects the internet protocol call and collects the identification information.

12. The apparatus of claim 1, wherein the one of the one or more call control components that connects the internet protocol call comprises a first call control component in a first internet protocol domain; and
    wherein the one of the one or more call control components that collects the identification information comprises a second call control component in a second internet protocol domain.

13. The apparatus of claim 12 in combination with the internet protocol endpoint, wherein the internet protocol endpoint comprises a first internet protocol endpoint in the first interne protocol domain, and wherein the communication device comprises a second internet protocol endpoint in the second internet protocol domain; and
    wherein first internet protocol endpoint sends a trace initiation message to the first call control component to initiate the collection of the identification information; and
    wherein the first call control component sends a gather identification information message to the second call control component; and
    wherein the second call control component queries a database of the second internet protocol domain to gather the identification information, and wherein the second call control component sends the identification information to the first call control component; and
    wherein the first call control component sends the identification information to the first internet protocol endpoint.

14. The apparatus of claim 1, wherein the one of the one or more call control components that collects the identification information performs a verification to check an access level of the internet protocol endpoint, and wherein the access level permits access to a first portion of the identification information; and
    wherein the one of the one or more call control components that collects the identification information performs a verification to check a protection level of the communication device, and wherein the protection level permits access to a second portion of the identification information; and
    wherein the one of the one or more call control components that sends the identification information to the internet protocol endpoint sends the identification information that is common to both the first portion and second portion of the identification information.

15. The apparatus of claim 1 in combination with the internet protocol endpoint, wherein the internet protocol endpoint sends a first H.323 message to the one of the one or more call control components that collects the identification information to trigger the collection of the identification information; and wherein the one of the one or more call control components that sends the identification information to the internet protocol endpoint sends the identification information to the internet protocol endpoint in a second H.323 message.

16. The apparatus of claim 1, wherein the one or more call control components support an internet protocol call trace service; and
wherein the internet protocol call trace service charges the internet protocol endpoint a fee for a subscription to the internet protocol call trace service; and
wherein the fee for the subscription is based on one or more of a flat monthly price, a number of times the internet protocol endpoint successfully employs the internet protocol call trace service, an amount of information requested from the internet protocol call trace service by the internet protocol endpoint, and a type of information requested from the internet protocol call trace service by the internet protocol endpoint.

17. The apparatus of claim 1, wherein any internet protocol endpoints may be employed with a password to access the identification information through the internet protocol call trace service.

18. The apparatus of claim 1, wherein another portion of the identification information is a uniform resource locator (URL).

19. The apparatus of claim 1, wherein a user is not limited to a particular internet protocol endpoint in accessing information from the internet protocol call trace service.

20. The apparatus of claim 1, wherein the one or more call control components keep a call trace log to record an activity of the internet protocol call trace service.

21. The apparatus of claim 1, wherein the one of the one or more call control components sends another error message to the internet protocol endpoint when the internet protocol endpoint is not authorized to obtain the identification information.

22. The apparatus of claim 1, wherein the one of the one or more call control components control audio, data, and video signaling and bearer traffic.

23. The apparatus of claim 1, wherein the internet protocol endpoint comprises a processor and a recordable data storage medium.

24. The apparatus of claim 1, wherein each of the one or more call control components has a recordable data storage medium.

25. A method, comprising the steps of:
receiving a request from an internet protocol (IP) endpoint for identification information of a communication device that initiated an internet protocol call with the internet protocol endpoint;
connecting to an IP network to a) communicatively couple a public switched telephone network (PSTN) to allow the internet protocol endpoint to communicate with at least one landline endpoint and b) allow the internet protocol endpoint to communicate with another internet protocol endpoint located in another IP domain; and
collecting the identification information of the communication device to send to the internet protocol endpoint in response to the request upon a determination that the internet protocol endpoint is authorized to obtain the identification information;
wherein the internet protocol endpoint comprises a call trace button; and
wherein activation of the call trace button sends a trace initiation message to initiate an internet protocol call trace service that collects the identification information of the communication device;
the method further comprising the step of:
sending an error message to the internet protocol endpoint when there is insufficient internet protocol call trace service information in an internet protocol service database.

26. The method of claim 25, wherein the step of collecting the identification information of the communication device to send to the internet protocol endpoint in response to the request comprises the step of:
identifying in the request one or more types of identification information of the communication device that the internet protocol endpoint indicated for inclusion in the identification information.

27. The method of claim 26, further comprising the steps of:
collecting the one or more types of identification information of the communication device from the internet protocol service database; and
sending the identification information that comprises the one or more types of identification information of the communication device to the internet protocol endpoint.

28. The method of claim 27, wherein the step of collecting the one or more types of identification information of the communication device from the internet protocol service database comprises the steps of:
forwarding the request from a first call control component that handles the internet protocol endpoint to a second call control component that handles the communication device;
collecting, by the second call control component, the one or more types of identification information of the communication device from the internet protocol service database that stores the identification information of the communication device; and
sending, by the second call control component, the one or more types of identification information of the communication device to the first call control component.

29. The method of claim 25, wherein the step of collecting the identification information of the communication device to send to the internet protocol endpoint in response to the request comprises the step of:
sending the identification information to the internet protocol endpoint at any one or more of before connection of the internet protocol call, at any time in the duration of the internet protocol call, or after completion of the internet protocol call.

30. The method of claim 25, wherein the step of collecting the identification information of the communication device to send to the internet protocol endpoint in response to the request comprises the step of:
verifying, prior to sending the identification information, that the internet protocol endpoint is permitted access to the identification information and that the communication device allows access to the identification information for the internet protocol endpoint.

* * * * *